Nov. 19, 1968     A. F. G. HANKEN     3,412,249
BACKSCATTER THICKNESS MEASURING GAUGE UTILIZING DIFFERENT
ENERGY LEVELS OF BREMSSTRAHLUNG AND TWO
IONIZATION CHAMBERS
Filed Aug. 4, 1964

ALBERT F.G. HANKEN
INVENTOR.

BY

*James J. O'Reilly*
AGENT

United States Patent Office 3,412,249
Patented Nov. 19, 1968

3,412,249
BACKSCATTER THICKNESS MEASURING GAUGE UTILIZING DIFFERENT ENERGY LEVELS OF BREMSSTRAHLUNG AND TWO IONIZATION CHAMBERS
Albert F. G. Hanken, Columbus, Ohio, assignor to Industrial Nucleonics Corporation, a corporation of Ohio
Substitute for abandoned application Ser. No. 122,956, July 10, 1961. This application Aug. 4, 1964, Ser. No. 387,525
12 Claims. (Cl. 250—83.6)

This is a substitute application for my application Ser. No. 122,956, filed July 10, 1961, and entitled "Measuring System," abandoned on July 23, 1964.

This invention relates generally to coating thickness gauges and more particularly to an improved radiation backscatter gauge for measuring discrete portions of the spectrum of bremsstrahlung energy generated in the material being measured.

Prior art systems illustrate measurement of beta backscatter to determine coating thickness. An "infinite thickness" of backer for the coating material is required before these systems can distinguish the coating thickness from the backer. In view of the inverse square law, the distance between the detector and the measured material must be rigidly maintained. If this distance should vary, a decrease in detected radiation intensity may be interpreted as an increase in coating thickness when in fact no change occurred. In addition, the corpuscular radiation employed in these systems is sensitive to magnetic fields inevitably present in industrial processes such as rolling mills.

To overcome these prior art disadvantages, the present invention directs a beam of beta particles toward the coated material. Bremsstrahlung radiation of a predetermined energy spectrum is generated by the material. The intensity of radiation in the low energy portion of the spectrum will be affected by the coating thickness. A pair of ionization chambers, one sensitive in the low energy provide output signals proportional to the intensity of the received radiation. The ratio of the output signals is computed and registered as an indication of the coating thickness of the material.

Accordingly, it is a primary object of the present invention to provide a radiation backscatter gauge not adversely affected by changes in geometry with respect to the measured material.

It is another object of the present invention to provide a radiation backscatter gauge which does not subject operating personnel to hazardous external radiation.

It is yet another object of the present invention to provide a radiation backscatter gauge that requires neither tedious adjustment nor constant servicing to maintain in proper operating condition.

It is also an object of the present invention to provide a radiation backscatter gauge having a low noise figure due to elimination of erratic beta backscattering.

These and numerous other advantages and features of the present invention will become more apparent from the following description when taken in conjunction with the drawings, in which.

Figure 1:
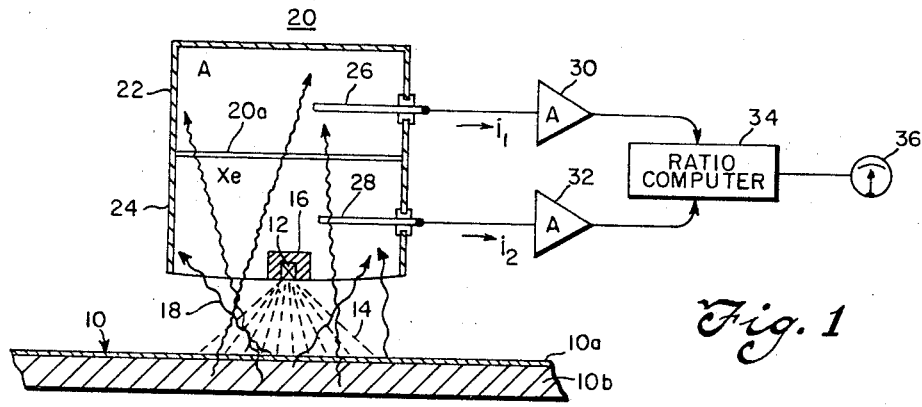
FIG. 1 is a sectional view partly diagrammatic of a coating thickness gauge in accordance with the present invention.

With reference now to the drawings and specifically to FIG. 1, a radiation source 12 such as strontium 90 provides a beam of beta radiation 14. Lead shielding 16 surrounds the source 12 to direct the radiation downwardly toward a coated sheet material 10. The sheet 10 may comprise a coating 10a deposited on a base material 10b such as typically found in industrial electrolytic tin plating processes.

A radiation detector 20 includes a pair of ionization chambers 22 and 24 having probes 26 and 28. The probes are respectively connected to amplifiers 30 and 32. The ratio of the outputs of amplifiers 30 and 32 is computed at 34 which may be of well-known construction. An indicator 36 is connected to the output of the ratio computer 34.

Figure 2:
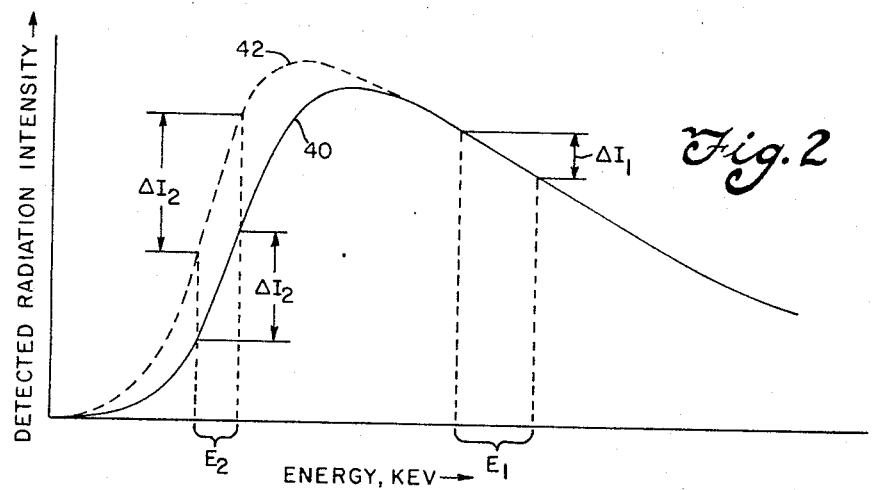
FIG. 2 is a graph of the bremsstrahling spectrum generated by the material shown in FIG. 1.

When the beta radiation 14 interacts with the nuclei of the atoms of the material 10, bremsstrahlung radiation 18 is emitted therefrom. The broad spectrum of radiation is illustrated in FIG. 2 wherein the bremsstrahlung radiation 18 ranges over a considerable band of wavelengths characteristics of the material 10 radiated and the activity of the source 12. Most of the higher energy photons originate in the thick base material 10b. The lower energy photons originate principally in a thin layer of base material immediately adjacent the coating 10a. The intensity of these low energy photons is affected by the coating thickness while the higher energy photon intensity is not. Therefore, if the atomic number Z of the coating 10a is greater than that of the base 10b, the amount of bremsstrahlung radiation in the low energy range, e.g., 10–50 kev., will be a sharp function of coating thickness. The curve 40 is indicative of a particular thickness of coating 10a. A different curve 42 displaced from curve 40 results from a somewhat thinner coating 10a since the amount of low energy bremsstrahlung will be substantially greater in this case. The operation of the present invention on a sheet 10 having a coating of lesser atomic number than the base is marginal when measuring thin coatings; however, performance improves with thick coatings as the low Z coating then becomes a significant absorber of low energy bremsstrahlung.

Figure 3:
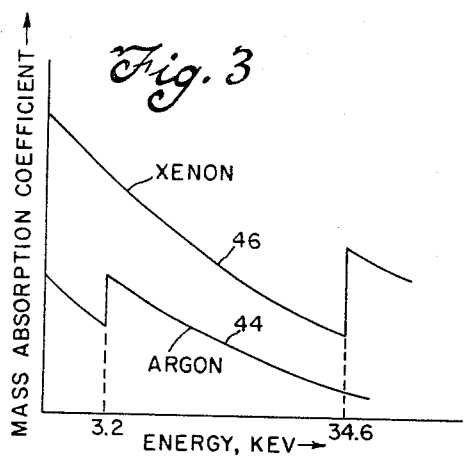
FIG. 3 is a graph of mass absorption cofficient vs. energy of incident radiation for ionization chambers having different filling gases.

To detect these changes in spectral content for different coating thicknesses, advantage is taken of the energy discrimination property of ionization chambers filled with gases of different atomic number. Referring to FIG. 3, the variation in mass absorption coefficient $\mu$ is illustrated for argon Z-18 and xenon Z-54. Both curves 44 and 46 are seen to be generally decreasing exponential functions of energy. In the low energy region 10–50 kev. the mass absorption coefficient of xenon is observed to be of much greater magnitude than that of argon. Since the detection efficiency of an ionization chamber is principally a function of the mass absorption coefficient of the filling gas, the xenon chamber accentuates the low energy photon.

In accordance with the present invention the lower chamber 24 is filled with xenon and is sensitive to photon energies between 10 and 50 kev. The upper chamber 22 is filled with argon and measures photon energies of the order of 100 kev. A membrane 20a may be used to separate the two gases and act as a window for the chamber 22. Alternatively, the same gas may be used in both chambers, but at different pressures.

Figure 4:
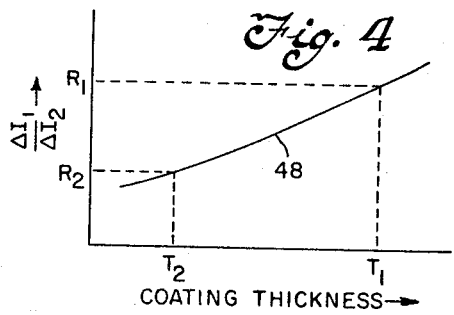
FIG. 4 is a calibration curve of the apparatus of FIG. 1.

In the operation of the present invention, photons of the lower energy range $E_2$ are immediately absorbed in the lower chamber 24 and cause an electrical signal to be developed which is amplified at 32. The photons of higher energy lying in the $E_1$ interval pass through the lower chamber 24 and are absorbed by the chamber 22 to provide another signal which is amplified at 30. The output of the amplifiers 30 and 32 are respectively proportional to the incremental changes in detected radiation intensity $\Delta I_1$ and $\Delta I_2$ illustrated in FIG. 2. The ratio $$\frac{\Delta I_1}{\Delta I_2}$$

yields a point $(T_1,R_1)$ on the calibration curve 48 in FIG. 4. Should the coating 10a decrease in thickness, in the low energy range, the detected response increases to a value $\Delta I_2'$; however, in the high energy channel the response remains substntially at the value $\Delta I_1$. The ratio $R_2$ becomes less and indicates a coating thickness $T_2$ less than $T_1$. Therefore, the meter 36 may be calibrated in units of thickness such as microinches to correspond with the curve 48. It should be noted that as the coating thickness increases, the coating 70a will eventually start to generate more and more bremsstrahlung, eventually masking the attenuation of backer-generated bremsstrahlung. There is therefore a maximum measureable coating thickness which can be distinguished for a given material.

The immunity of the measuring system to geometry problems is apparent from FIG. 2. If the distance between the detector 20 and sheet 10 is changed, the spectral curve 40, e.g., changes in relative magnitude but retains its characteristic shape. The magnitudes of $\Delta I_1$ and $\Delta I_2$ change a like amount and the ratio R is maintained constant. It should be apparent that the ratio $$\frac{\Delta I_2}{\Delta I_1}$$

may also represent coating thickness in which case the meter 36 must be calibrated differently.

While the invention has been described and illustrated as a specific embodiment thereof in connection with a type of apparatus wherein it is evident the objects of the invention are accomplished, it is also evident that the principles of the invention may be utilized in many other applications and that many modifications of the disclosed apparatus are possible without departing from the spirit and scope of the invention as set forth in the appended claims.

I claim:
1. Apparatus for determining the thickness of a coating of one material on a base of another material comprising:
   a radiation source for directing a beam of beta particles into the exposed surface of said coating to generate in said materials bremsstrahlung radiation which is emitted from said surface with a spectral distribution which varies with the thickness of said coating,
   a first ionization chamber for detecting the intensity of the lower energy photons in said spectral distribution,
   a second ionization chamber for detecting the intensity of the higher energy photons in said spectral distribution,
   means connected to said chambers for computing the ratio of one of said detected intensities with the other,
   and means for indicating said thickness as a function of said computed ratio.
2. Apparatus for determining the thickness of a coating of one material on a base of another material, apparatus comprising:
   a radiation source for directing a beam of beta particles into the exposed surface of said coating to generate in said materials bremsstrahlung radiation of a given spectral distribution which varies with the thickness of said coating,
   a first ionization chamber for detecting the intensity of the lower energy photons in said spectral distribution,
   a second ionization chamber for detecting the intensity of the higher energy photons in said spectral distribution,
   means connected to said chambers for generating first and second electrical signals proportional to said detected radiation intensities,
   separate amplifier means connected to said electrical signal generating means for amplifying said first and said second electrical signals,
   computer means connected to said amplifiers for forming the ratio of said first amplified electrical signal to said second amplified electrical signal,
   and means for indicating said thickness as a function of said ratio.
3. Apparatus as set forth in claim 2 in which said first and said second ionization chambers are respectively filled with first and second gases of different atomic number.
4. Apparatus for determining the thickness of a coating of one material on a base of another material comprising:
   a radiation source for directing a beam of beta particles into the exposed surface of said coating to generate in said materials bremsstrahlung radiation having a spectral distribution which varies with said thickness.
   a first ionization chamber having one side mounted adjacent said coating for detecting the intensity of the low energy photons in said spectral distribution,
   a second ionization chamber mounted adjacent said first ionization chamber on the opposite side thereof from said coating for detecting the intensity of said high energy photons in said spectral distribution which have passed through said first chamber without being absorbed therein,
   means connected to said chambers for computing the ratio of one of said detected intensities to the other,
   and means for indicating said thickness as a function of said computed ratio.
5. Apparatus for determining the thickness of a coating of one material on a base of another material comprising:
   a radiation source for directing a beam of beta particles into the exposed surface of said coating to generate in said materials bremsstrahlung radiation having a spectral distribution which varies with said thickness,
   a first ionization chamber filled with argon for detecting the intensity of the lower energy photons in said special distribution,
   a second ionization chamber filled with xenon for detecting the intensity of the higher energy photons in said spectral distribution,
   means connected to said chambers for generating first and second electrical signals proportional to said detected radiation intensities,
   separate amplifier means connected to said electrical signal generator means for amplifying said first and and said second electrical signals,
   and computer means connected to said amplifiers for forming the ratio of said first amplified electrical signal to said second amplified electrical signal,
   and means for indicating said thickness as a function of said ratio.
6. In an apparatus for measuring the thickness of a layer of a first material having a given effective atomic number placed upon an underlayer of a second material having a different atomic number, said apparatus comprising a beta ray source for directing into the exposed surfaces of said first material a beam of beta particles whereby one variable portion of said beam is absorbed in said first layer and another variable portion penetrates through said first layer and is at least partially absorbed in said second layer and whereby a portion of the energy of said beta rays absorbed in said first layer is converted to a first bremsstrahlung having a first spectral distribution which is emitted from said exposed surface with an intensity dependent on the thickness of said first layer and whereby a portion of the energy of said beta rays absorbed in said second layer is converted to a second bremsstrahlung having a second spectral distribution which is also emitted from said exposed surface with an intensity dependent on the thickness of said first layer, said apparatus further comprising means for detecting radiation emitted from said exposed surface for the purpose of developing an output signal indicating the thickness of said first layer, the improvement for obtaining said signal independently of the distance of said source and detecting means from said layers, in which said detecting and signal developing means comprises:

means responsive in a major degree to bremsstrahlung having said first spectral distribution and simultaneously responsive in a minor degree to bremsstrahlung having said second spectral distribution for providing a first signal having a major component proportional to said intensity of said first emitted bremsstrahlung and a minor component proportional to said intensity of said second emitted bremsstrahlung, means responsive in a major degree to bremsstrahlung having said second spectral distribution and simultaneously responsive in a minor degree to bremsstrahlung having said first spectral distribution for providing a second signal having a major component proportional to said intensity of said emitted second bremsstrahlung and a minor component proportional to said emitted first bremsstrahlung, and means responsive to a ratio of said first and second signals for providing said output signal indicating the thickness of said first layer.

7. A device for measuring a characteristic of a material, comprising:

a source of nuclear radiation for irradiating said material having said characteristic to be measured, detection means for detecting radiation back-scattered from said material and producing a first signal that is a function of the amount of said radiation in a first energy range that varies in accordance with said characteristic and the distance of said material from said source and a second signal that is a function of the amount of said radiation in a second energy range different from said first energy range, said second energy range radiation varying in accordance substantially only with said distance, and, means for combining said signals to produce a signal that is a function only of said material characteristic.

8. A device for measuring a characteristic of a material, comprising:

a source of radiation for irradiating said material having said characteristic to be measured, detection means for detecting radiation baskscattered from said material in two different energy ranges and for producing a first signal that is the function of the amount of said backscattered radiation falling within one of said energy ranges and a second signal that is a function of the amount of said backscattered radiation falling within the other of said energy ranges, one of said energy range radiations being a function of said material characteristic and of the distance of said source of radiation from said material, the other of said energy range radiations being a function substantially only of said distance, and means for combining said signals to determine said material characteristic despite variations in said source distance.

9. A device for measuring a characteristic of a material, comprising:

a source of beta radiation for irradiating said material having said characteristic to be measured, detection means for detecting bremsstrahlung radiation backscattered from said material and producing a first signal proportional to the amount of said bremsstrahlung radiation falling in a first energy range and a second signal proportional to the amount of said backscattered bremsstrahlung radiation falling within a second energy range different from said first energy range, and means for combining said signals to produce a signal that is a function only of said mtaerial characteristic.

10. A device for measuring a characteristic of a material, comprising:

a source of beta radiation directed into said material to generate therein bremsstrahlung radiation having an energy spectral distribution whose low energy portion varies with said characteristic, a first ionization chamber for detecting the intensity of low energy photons in said spectral distribution, a second ionization chamber for detecting the intensity of high energy photons in said spectral distribution, means for coupling said ionization chambers for computing the ratio of said detected intensities, and means for indicating a value for said characteristic in accordance with said ratio.

11. A device for measuring thickness of a material, comprising:

a course of beta radiation for irradiating said material having said characteristic to be measured, means for detecting in a mutually discriminatory mannear bremsstrahlung radiation backscattered from said material and producing a first and a second signal, said first signal being a function of the thickness of said material and of spacing between said material and said detecting means, said second signal being a function only of said spacing, means for combining said signals to provide an output signal proportional to said material thickness substantially independent of said detecting means spacing, and means for registering an indication of said output signal.

12. Apparatus for measuring the thickness of a coating material on a base material comprising:

means for directing a beam of beta particles into said coating material to generate in said coating material bremsstrahlung radiation having a spectral distribution which varies wtih said coating thickness, means for measuring the intensity of backscattered low energy photons in said spectral distribution, means for measuring the intensity of backscattered high energy photons in said spectral distribution, and means for comparing said measurements to indicate the thickness of said coating material.

References Cited

UNITED STATES PATENTS

| | | | |
|---|---|---|---|
| 2,741,709 | 4/1956 | Tirico et al. | 250—83.6 |
| 2,884,535 | 4/1959 | Swift. | |
| 2,920,206 | 1/1960 | Heller | 250—83.3 X |
| 2,922,888 | 1/1960 | Faulkner et al. | |
| 2,939,012 | 5/1960 | Scherbatskoy | 250—83.3 X |
| 2,967,934 | 1/1961 | Martinelli | 250—83.3 X |
| 3,100,261 | 8/1963 | Bigelow | 250—83.6 X |
| 3,135,865 | 6/1964 | Reed et al. | 250—106 X |
| 3,150,261 | 9/1964 | Furbee et al. | 250—43.5 X |
| 3,256,431 | 6/1966 | Fraser | 250—43.5 R |

ARCHIE R. BORCHELT, *Primary Examiner.*

UNITED STATES PATENT OFFICE
CERTIFICATE OF CORRECTION

Patent No. 3,412,249　　　　　　　　　　Dated November 19, 1968

Inventor(s) Albert F. G. Hanken

It is certified that error appears in the above-identified patent and that said Letters Patent are hereby corrected as shown below:

Column 1, lines 40-41, "energy provide" should read ---energy region and the other sensitive in a region of much higher energy, provide---.

Claim 4, column 4, line 21, "thickness." should read ---thickness,---.

Claim 5, column 4, line 42, "argon" should read ---xenon---; claim 5, column 4, line 44, "special" should read ---spectral--- claim 5, column 4, line 45, "xenon" should read ---argon---.

Claim 6, column 4, line 64, "surfaces" should read ---surfac ---.

Claim 11, column 6, line 28, "course" should read ---source ---; claim 11, column 6, line 31, "near" should read ---ner---."

SIGNED AND
SEALED
JAN 12 1971

(SEAL)
Attest:

Edward M. Fletcher, Jr.
Attesting Officer

WILLIAM E. SCHUYLER, JR.
Commissioner of Patents